(12) United States Patent
Negroni (10) Patent No.: US 8,196,627 B2
(45) Date of Patent: Jun. 12, 2012

(54) TIRE HAVING A COATED SURFACE

(75) Inventor: Fabio Negroni, Milan (IT)

(73) Assignee: Pirelli Tyre S.p.A., Milan (IT)

(*) Notice: Subject to any disclaimer, the term of this patent is extended or adjusted under 35 U.S.C. 154(b) by 795 days.

(21) Appl. No.: 12/227,795

(22) PCT Filed: May 31, 2006

(86) PCT No.: PCT/EP2006/005177
§ 371 (c)(1),
(2), (4) Date: Nov. 26, 2008

(87) PCT Pub. No.: WO2007/137608
PCT Pub. Date: Dec. 6, 2007

(65) Prior Publication Data
US 2009/0250150 A1    Oct. 8, 2009

(51) Int. Cl.
*B60C 5/00* (2006.01)
*C08F 283/04* (2006.01)
*C08K 3/34* (2006.01)

(52) U.S. Cl. ........ 152/240; 525/425; 525/123; 525/453; 524/500; 524/431; 524/449; 524/456; 524/439; 524/447; 252/301.35; 427/299

(58) Field of Classification Search .......... 152/240; 525/425, 123, 453; 524/500, 431, 449, 456, 524/439, 447; 252/301.35; 427/299
See application file for complete search history.

(56) References Cited

U.S. PATENT DOCUMENTS

| | | | |
|---|---|---|---|
| 3,648,748 A | | 3/1972 | Lovell |
| 4,421,899 A | * | 12/1983 | Yamazaki et al. ............ 525/189 |
| 4,768,937 A | | 9/1988 | Signh |
| 4,872,822 A | | 10/1989 | Pizzorno |
| 2004/0050471 A1 | | 3/2004 | Cottin et al. |
| 2004/0055680 A1 | | 3/2004 | Cottin et al. |
| 2006/0057394 A1 | | 3/2006 | Cork |

FOREIGN PATENT DOCUMENTS

| | | | |
|---|---|---|---|
| EP | 0 199 064 B1 | | 10/1986 |
| EP | 1 279 486 A2 | | 1/2003 |
| WO | WO 98/14338 | | 4/1998 |
| WO | WO 03/101713 A1 | | 12/2003 |
| WO | WO 2006/030029 | * | 3/2006 |
| WO | WO 2006/030029 A1 | | 3/2006 |
| WO | WO 2006/032034 A2 | | 3/2006 |

OTHER PUBLICATIONS

Miyabe, N., "Tire Applied with Barrier Coat Agent at Sidewall," Patent Abstracts of Japan, of JP. No. 2004058752, publication date Feb. 26, 2004, 1 sheet.

* cited by examiner

*Primary Examiner* — Robert D. Harlan
(74) *Attorney, Agent, or Firm* — Finnegan, Henderson, Farabow, Garrett & Dunner, L.L.P.

(57) ABSTRACT

A tire includes at least one outer structural element, wherein the at least one outer structural element is at least partially coated by at least one coating layer including a crosslinked composition obtained by reacting: (a) at least one polysulfide polymer; (b) at least one thermoplastic polymer having at least one hydroxyl group; with (c) at least one polyisocyanate. Preferably, the at least one structural element is at least one of the tire sidewalls.

53 Claims, 1 Drawing Sheet

TIRE HAVING A COATED SURFACE

CROSS REFERENCE TO RELATED APPLICATION

This application is a national phase application based on PCT/EP2006/005177, filed May 31, 2006, the content of which is incorporated herein by reference.

BACKGROUND OF THE INVENTION

1. Field of the Invention

The present invention relates to a tire having a coated surface, in particular a coated outer surface.

More in particular, the present invention relates to a tire comprising at least one outer structural element, said at least one outer structural element being at least partially coated by at least one coating layer including a crosslinked composition in order to modify its surface appearance, in particular in order to obtain an outer structural element having a coloured and/or a glossy surface.

2. Description of the Related Art

Compositions intended to cover the outer surface of tires, in particular coloured compositions, are already known in the art.

For example, U.S. Pat. No. 3,648,748 relates to a tire comprising a cured rubber tire having adhered thereto a laminate of a cured polyurethane comprising a cured reaction mixture prepared by reacting an organic polyisocyanate with a reactive hydrogen containing polymeric material having a molecular weight of from about 700 to about 5000 and a hydroxyl functionality greater than 2.0 up to about 3.0 selected from hydroxyl terminated polymers of the group consisting of polymer and copolymers of 1,3-diene hydrocarbons having 4 to 6 carbon atoms, copolymers of 1,3-diene hydrocarbons having 4 to 6 carbon atoms with styrene, acrylonitrile, ethyl acrylate and chloro substituted 1,3-diene hydrocarbons having 4 to 6 carbon atoms. The tire is prepared by the method which comprises (A) cleaning a portion of the surface of a cured rubber tire to be coated with a solvent, (B) coating the said surface with the liquid polyurethane reaction mixture and (C) curing the said reaction mixture to form a composite structure. The abovementioned laminate is said to be formed on the cured rubber tire without previously chemically treating the rubber and to provide a decorative, protective or identification surface for the tire.

International Patent Application WO 98/14338 relates to a method of imprinting markings on rubber articles, more particularly tires, the marking being applied by means of ink and the rubber article comprising no wax or stabilizer additives in the marking portion, characterized by the marking being imprinted (for example, by a tampon printing method) and by the ink comprising a binding agent which is adapted to the rubber blend of the marking portion. Preferably, said ink is a solvent-based two component ink comprising from 20% to 35% of coloring pigments and/or from 2% to 5% vehicle and/or from 40% to 60% solvent and/or from 15% to 20% binding agent said binding agent comprising polyurethane resin and polyurethane prepolymer. Preferably, the ink is cured with aliphatic or aromatic isocyanates. The abovementioned method is said to give good durability of the marking on the rubber article. In addition, by eliminating wax or stabilizer additives, there is no risk of the tire or marking in the marking portion becoming discolored.

United States Patent Application 2004/0050471 relates to a tire having an outer rubber surface based at least in part on essentially unsaturated diene elastomers, said outer rubber surface covered with a coloured coating bonded thereto, said colored coating having at least one layer in contact with air and including a composition comprising:

(1) a polyurethane in majority proportion; and
(2) flakes of aluminum in an amount of between 20 and 150 parts of flakes per hundred parts of dry polyurethane (phr);

wherein the polyurethane is produced from a polyol selected from the group consisting of aliphatic polyethers, aliphatic polyesters, polyethers having a main chain that is semi-aromatic and polyesters having a main chain that is semi-aromatic; and the bond between the elastomer and coloured coating results from interaction of the polyurethane and polar functions on the elastomer. In fact, said composition is laid on the vulcanized tire after treatment of the tire surface to provide reactive polar functions. The above-mentioned colored coating is said to inhibit the degradation due to oxidation and ozone and greatly limits the migration of the antioxidants towards the surface of the tire, allowing the rubber composition to retain its color. Furthermore, the coating prevents the migration of the waxes towards the surface by a barrier effect, thereby avoiding efflorescence and retaining its surface appearance.

United States Patent Application 2004/0055680 relates to a tire having an outer rubber surface based at least in part on essentially unsaturated diene elastomers, said outer rubber surface covered with a coloured coating bonded thereto, said coloured coating having at least one layer in contact with air and including a composition comprising:

(1) a polyurethane in majority proportion; and
(2) flakes of mica in an amount of between 10 and 80 parts of flakes per hundred parts of dry polyurethane (phr);

wherein the polyurethane is produced from a polyol selected from the group consisting of aliphatic polyethers, aliphatic polyesters, polyethers having a main chain that is semi-aromatic and polyesters having a main chain that is semi-aromatic; and the bond between the elastomer and coloured coating results from interaction of the polyurethane and polar functions on the elastomer. In fact, said composition is laid on the vulcanized tire after treatment of the tire surface to provide reactive polar functions. The abovementioned coloured coating is said to inhibit the degradation due to oxidation and ozone and greatly limits the migration of the antioxidants towards the surface of the tire, allowing the rubber composition to retain its colour. Furthermore, the coating prevents the migration of the waxes towards the surface by a barrier effect, thereby avoiding efflorescence and retaining its surface appearance.

According to the Applicant, the compositions described above may show some disadvantages.

For example, the Applicant has noticed that the application of liquid polyurethane reaction mixtures (i.e., a liquid reaction mixture comprising an organic polyisocyanate and a polymeric material containing reactive hydrogen atoms) to the surface of the vulcanized tires which has to be coated, may cause release of carbon dioxide which may lead to the formation of defects on the coated surface with a consequent poor appearance of the same. On the other end, the Applicant has noticed that the use of compositions comprising polyurethanes may show discoloration problems due to the surface migration of antioxidants, antiozonants and waxes usually present in the elastomeric compositions, in particular in those used in tires manufacturing. Moreover, difficulties have been encountered in obtaining a good adhesion between compositions comprising polyurethanes and the surface of the vulcanized tires to be coated.

SUMMARY OF THE INVENTION

The Applicant has faced the problem of providing a composition which may be applied onto the surface of vulcanized tires which overcome all the disadvantages above disclosed.

The Applicant has now found that it is possible to overcome the above disclosed disadvantages by applying onto the surface of vulcanized tires a crosslinkable composition obtained by mixing a first component comprising at least one polysulfide polymer and at least one thermoplastic polymer having at least one hydroxyl group, with a second component comprising at least one polyisocyanate. Said crosslinkable composition allows to form a coating layer which is flexible and strongly adheres to the surface of the vulcanized tires even without previously chemically treating said surface. Moreover, the rubbery behaviour of said coating layer makes it possible to withstand all the deformations experienced by the tires during use. Moreover, said coating layer may give to said surface a non-staining appearance (i.e., said surface does not show discoloration problems). Furthermore, said coating layer may allow to obtain a coloured surface. Moreover, said coating layer may also give to said surface a glossy appearance. Moreover, the formation of defects during the application of said crosslinkable composition onto said surface is avoided. Furthermore, said coating layer may also be able to protect said surface against the action of ozone.

According to a first aspect, the present invention relates to a tire comprising at least one outer structural element, wherein said at least one outer structural element is at least partially coated by at least one coating layer including a crosslinked composition obtained by reacting:
(a) at least one polysulfide polymer;
(b) at least one thermoplastic polymer having at least one hydroxyl group; with
(c) at least one polyisocyanate.

According to one preferred embodiment, the tire comprises:
   a carcass structure of a substantially toroidal shape, having opposite lateral edges associated with respective right-hand and left-hand bead structures, said bead structures comprising at least one bead core and at least one bead filler;
   a belt structure applied in a radially external position with respect to said carcass structure;
   a tread band radially superimposed on said belt structure;
   a pair of sidewalls applied laterally on opposite sides with respect to said carcass structure;
wherein said at least one outer structural element is at least one of said sidewalls.

According to a further aspect, the present invention relates to a kit for surface treatment of crosslinked elastomeric articles comprising:
   a first component comprising (a) at least one polysulfide polymer and (b) at least one thermoplastic polymer having at least one hydroxyl group;
   a second component comprising (c) at least one polyisocyanate.

According to a further aspect, the present invention relates to a crosslinked manufactured article comprising a crosslinked elastomeric composition, said crosslinked manufactured article being at least partially coated by at least one coating layer including a crosslinked composition obtained by reacting:
(a) at least one polysulfide polymer;
(b) at least one thermoplastic polymer having at least one hydroxyl group; with
(c) at least one polyisocyanate.

According to one preferred embodiment, said crosslinked composition may further comprise at least one colouring agent (d).

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to one preferred embodiment, said at least one polysulfide polymer (a) may be selected, for example, from liquid polysulfide polymers having an average molecular weight (number-average) of from 500 g/mol to 10,000 g/mol, preferably of from 800 g/mol to 8,000 g/mol. Said average molecular weight (number-average), may be determined by techniques known in the art such as, for example, by gel permeation chromatography (GPC).

According to a further preferred embodiment, said at least one polysulfide polymer (a) may be selected, for example, from compounds having the following general formulae (I) or (II):

wherein:
   R is an alkylenoxy group, preferably a —$(CH_2)_2$—O—$CH_2$—O—$(CH_2)_2$— group;
   n is an integer of from 4 to 60, preferably of from 5 to 40, extremes included;
   a, b, and c are integers, equal or different from each other, a+b+c being comprised from 4 to 60, preferably from 5 to 40, extremes included;
or mixtures thereof.

Examples of polysulfide polymers (a) which may be used according to the present invention and are commercially available are the products Thioplast® from Akzo Nobel, or Thiokol® LP from Toray Thiokol KK.

According to one preferred embodiment, said at least one polysulfide polymer (a) is present in the crosslinked composition in an amount of from 5% by weight to 80% by weight, preferably from 20% by weight to 70% by weight, with respect to the total weight of the dry crosslinked composition.

According to one preferred embodiment, said at least one thermoplastic polymer having at least one hydroxyl group (b) contains hydroxyl groups in its molecule in an amount not lower than 1% by weight, preferably of from 1.5% by weight to 20% by weight, with respect to the total weight of the thermoplastic polymer (b).

Said hydroxyl groups may be linked to the main chain of the thermoplastic polymer and/or to its side chain.

According to a further preferred embodiment, said at least one thermoplastic polymer having at least one hydroxyl group (b) has a glass transition temperature higher than or equal to 20° C., preferably of from 30° C. to 150° C., more preferably of from 45° C. to 100° C.

According to a further preferred embodiment, said thermoplastic polymer having at least one hydroxyl group (b) is selected from:
($b_1$) vinyl chloride copolymers;

(b$_2$) hydrogenated polyketones;
or mixtures thereof.

According to one preferred embodiment, said vinyl chloride copolymers (b$_1$) may be selected, for example, from copolymers of vinyl chloride with at least one other vinyl comonomer.

The term "copolymer" as used herein includes copolymers of vinyl chloride with two or more comonomers, and thus includes, for example, terpolymers.

Preferably, the vinyl chloride copolymers (b$_1$) may be prepared by copolymerizing vinyl chloride with at least one vinyl comonomer which may be selected, for example, from: vinyl acetate, vinyl alcohol, 2-propenyl acetate, acrylic acid, acrylic acid esters (such as, for example, methyl methacrylate, 2-hydroxypropyl acrylate, glycidyl methacrylate), isobutyl vinyl ether, maleic acid, vinyl stearate, acrylamide, vinyl sulfonic acid, vinylidene chloride, or mixtures thereof.

Vinyl chloride/acrylic acid ester copolymers, vinyl chloride/vinyl acetate copolymers, or mixtures thereof, are particularly preferred.

Said vinyl chloride copolymers (b$_1$) may further contain carboxylic and/or epoxy functional groups in their molecule.

Alternatively, said vinyl chloride copolymers (b$_1$) comprise terpolymers of vinyl chloride, another vinyl compound such as vinyl acetate, and an unsaturated carboxylic or polycarboxylic acid or ester. Some examples of useful terpolymers include vinyl chloride/vinyl acetate/maleic acid terpolymers, vinyl chloride/vinyl acetate/acrylic acid terpolymers, vinyl chloride/vinyl acetate/crotonic acid terpolymers, or mixture thereof.

Said vinyl chloride copolymers (b$_1$) may be obtained commercially or may be synthesized by a free radical initiated polymerization of vinyl chloride, at least one other vinyl comonomer and, optionally, at least one unsaturated carboxylic or polycarboxylic acid or ester.

Examples of vinyl chloride copolymers (b$_1$) which may be used according to the present invention and are commercially available are the products Vinnol® from Waker.

According to one preferred embodiment said hydrogenated polyketones (b$_2$) may be selected from compounds having the following general formula (III):

wherein:
R groups, which may be equal or different from each other, represent a linear or branched $C_1$-$C_{20}$ alkyl group; a $C_6$-$C_1$ aryl group;
the n:m ratio is of from 0.1:1 to 1:1, preferably of from 0.3:1 to 0.5:1.

Example of compounds having general formula (III) which may be used according to the present invention are: hydrogenated poly(vinyl methyl ketone), hydrogenated poly(vinyl butyl ketone), hydrogenated poly(vinyl phenyl ketone), hydrogenated poly(vinyl naphthyl ketone), or mixtures thereof. Hydrogenated poly(vinyl phenyl ketone) is particularly preferred.

According to one preferred embodiment, said at least one thermoplastic polymer having at least one hydroxyl group (b) is present in the crosslinked composition in an amount of from 1% by weight to 50% by weight, preferably from 5% by weight to 25% by weight, with respect to the total weight of the dry crosslinked composition.

According to one preferred embodiment, said at least one polyisocyanate (c) may be selected, for example, from aliphatic polyisocyanates such as, for example, trimethylene diisocyanate, 1,2-propylene diisocyanate, tetramethylene diisocyanate, 2,3-butylene diisocyanate, hexamethylene diisocyanate, octamethylene diisocyanate, 4-isocyanatomethyl-1,8-octane diisocyanate, 2,2,4-trimethyl hexamethylene diisocyanate, 2,4,4-trimethyl hexamethylene diisocyanate, dodecamethylene diisocyanate, α,α'-dipropyl ether diisocyanate, transvinylidene diisocyanate, or mixtures thereof; alicyclic polyisocyanates such as, for example, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, isophorone diisocyanate, or mixtures thereof; aromatic polyisocyanates such as, for example, m- and p-phenylene diisocyanate, 1,3- and 1,4-bis (isocyanate methyl)benzene, 1,5-dimethyl-2,4-bis(isocyanate methyl)benzene, 1,3,5-triisocyanate benzene, 2,4- and 2,6-toluene diisocyanate, 2,4,6-toluene triisocyanate, α,α,α', α'-tetramethyl o-, m-, and p-xylylene diisocyanate, 4,4'-diphenylene diisocyanate methane, 4,4-diphenylene diisocyanate, 3,3'-dichloro-4,4'-diphenylene diisocyanate, naphthalene-1,5-diisocyanate, or mixtures thereof; or mixtures thereof.

According to a further preferred embodiment, said at least one polyisocyanates (c) may be selected, for example, from adducts of polyisocyanates such as, for example, biurets, isocyanurates, allophonates, uretdiones, prepolymers of polyisocyanates, or mixtures thereof. Examples of such adducts which may be advantageously used are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the reaction product of 3 moles of m-α,α,α',α'-tetramethylxylene diisocyanate with 1 mole of trimethylol propane, the adduct of 1 molecule of pentaerythritol to 4 molecules of toluene diisocyanate, the isocyanurate of hexamethylene diisocyanate available from Bayer under the tradename Desmodur® N3390 and Desmodur® LS2025, the uretdione of hexamethylene diisocyanate available from Bayer under the tradename Desmodur® N3400, the allophonate of hexamethylene diisocyanate available from Bayer under the tradename Desmodur® LS 2101, the adduct of 3 moles of toluene diisocyanate to 1 mole of trimethylol propane available from Bayer under the tradename Desmodur® L, the isocyanurate of isophorone diisocyanate available from Huls under the tradename Vestanat® T1890, or mixtures thereof. Furthermore, (co)polymers of isocyanate-functional monomers such as, for example, α,α'-dimethyl-m-isopropenyl benzyl isocyanate, may also be used. The adducts of isocyanurate of hexamethylene diisocyanate are particularly preferred.

According to one preferred embodiment, said at least one polyisocyanate (c) is present in the crosslinked composition in an amount of from 5% by weight to 50% by weight, preferably from 10% by weight to 30% by weight, with respect to the total weight of the dry crosslinked composition.

As disclosed above, said crosslinked composition may further comprise at least one colouring agent (d).

According to one preferred embodiment, said colouring agent (d) may be selected, for example, from: iron oxide, titanium dioxide, mica, calcium sodium borosilicate, powdered metals such as powdered aluminum or copper, metal pastes such as aluminum pastes, colouring pastes containing pigments, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof.

According to one preferred embodiment, said at least one colouring agent (d) is present in the crosslinked composition in an amount of from 1% by weight to 50% by weight, preferably from 4% by weight to 30% by weight, with respect to the total weight of the dry crosslinked composition.

Reinforcing fillers such as, for example, carbon black or silica, may be present in the crosslinked composition above disclosed to impart other properties to said crosslinked composition, as long as the colour of the filler does not modify or adversely change the desired colouration of the crosslinked composition. The presence of carbon black in very small proportion, i.e. a few phr [phr=parts per hundred part of polysulfide polymer (a)], allows one to obtain a colour with a darker appearance, especially with red, blue, or green pigments.

The above disclosed composition may be applied onto the surface of a crosslinked manufactured article comprising a crosslinked elastomeric composition, in particular onto the surface of an outer structural element of a vulcanized tire.

According to a further aspect, the present invention also relates to a method of applying a crosslinkable composition comprising a first component and a second component onto the surface of a crosslinked manufactured article comprising a crosslinked elastomeric composition, in particular onto the surface of an outer structural element of a vulcanized tire, said method comprising the following steps:

(i) cleaning at least one portion of the surface to be coated with a solvent;

(ii) mixing the first component comprising (a) at least one polysulfide polymer and (b) at least one thermoplastic polymer having at least one hydroxyl group, with a second component comprising (c) at least one polyisocyanate, so as to obtain a crosslinkable composition;

(iii) applying the crosslinkable composition obtained in step (ii) onto said surface, so as to obtain a coating layer.

Preferably, the solvent used in step (i) may be selected from: ketones such as, for example, acetone, methyl ethyl ketone, methyl isobutyl ketone, or mixtures thereof; alcohols such as, for example, methanol, ethanol, isopropanol, butanol, or mixtures thereof; aliphatic or aromatic hydrocarbons such as, for example, pentane, hexane, heptane, benzene, toluene, or mixtures thereof; or mixtures thereof. Preferably, after said cleaning step (i), the surface may be left to dry (for example, for 5 minutes to 30 minutes) to allow the solvent to evaporate.

Preferably, in order to avoid an excessive increase of the viscosity of the crosslinkable composition obtained in step (ii), said first component and said second component are made and stored separately, their mixing being made just before to carry out the above disclosed step (iii). Preferably, said first component and said second component may be mixed together not more than 24 hours, preferably from 5 minutes to 16 hours, before step (iii) is carried out. Preferably, after being made, said first component and said second component are carefully sealed to protect them from the action of moisture.

According to one preferred embodiment, both said first component and said second component further comprise at least one organic solvent.

Preferably, said at least one organic solvent may be selected, for example, from: esters such as, for example, methyl acetate, butyl acetate, isobutyl acetate, propyl acetate, or mixtures thereof; ketones such as, for example, acetone, methyl ethyl ketone, methyl isobutyl ketone, or mixtures thereof; alcohols such as, for example, methanol, ethanol, isopropanol, butanol, or mixtures thereof; aliphatic or aromatic hydrocarbons such as, for example, pentane, hexane, heptane, benzene, toluene, or mixtures thereof; or mixtures thereof. Butyl acetate, methyl ethyl ketone, or mixtures thereof are particularly preferred.

According to one preferred embodiment, said at least one organic solvent is present in the crosslinkable composition in an amount of from 20% by weight to 80% by weight, preferably from 30% by weight to 50% by weight, with respect to the total weight of the crosslinkable composition.

In order to promote the crosslinking reaction between the hydroxyl groups of the compound (b) and of the mercaptan end-groups of the compound (a) with the polyisocyanate (c), at least one catalysts may be added to said crosslinkable composition. Preferably, said catalyst may be added to the second component of the crosslinkable composition. Said catalyst may be selected, for example, from: organometallic compounds, amines, or mixtures thereof. The organometallic compounds may be organotin compounds such as, for example, dimethyltin dilaurate, dibutyltin dilaurate, dibutyltin dimercaptide, or mixtures thereof. The preferred catalyst is dibutyltin dilaurate. The catalyst is used in an amount effective to promote the reaction. Preferably, it is used in an amount of from 0.01% by weight to 2% by weight, preferably of from 0.01% by weight to 0.06% by weight, with respect to the total weight of the crosslinkable composition.

Said applying step (iii) may be carried out with techniques known in the art such as, for example, by painting, brushing, spraying, rolling, dipping, scraping, pad printing.

Preferably, after the applying step (iii) above reported is carried out, the crosslinked manufactured article may be left to dry at ambient temperature (23° C.), for a time of from 20 hours to 72 hours, preferably of from 24 hour to 48 hours.

Alternatively, in order to accelerate said drying, the crosslinked manufactured article may be dried by heating at a temperature of from 50° C. to 120° C., preferably of from 40° C. to 80° C., for a time of from 10 minutes to 6 hours, preferably of from 30 minutes to 2 hours.

Usually, during the above reported drying, crosslinking reaction between the hydroxyl groups of the compound (b) and of the mercaptan end-groups of the compound (a) with the polyisocyanate (c) may be obtained.

Depending on the means used to applying the crosslinkable composition, the thickness of the coating layer obtained, after drying, may be varied. Good results are obtained with a dried coating layer having a thickness not lower than 30 μm.

However, the desired thickness may vary according to the surface where the composition is applied.

For example, in the case of a vulcanized tire, a thickness of from 30 μm to 200 μm, may be sufficient on the tire sidewalls while, a higher thickness such as, for example, of from 100 μm to 300 μm, may be required for the bottoms of the grooves of the tread patterns of the tire, or in the zones where a protective effect of the coating layer is required with respect to the atmosphere.

The crosslinked manufactured article, in particular the outer structural element of a vulcanized tire, which has to be coated is usually obtained by crosslinking a crosslinkable elastomeric composition comprising at least one elastomeric polymer, preferably at least one diene elastomeric polymer. Preferably, said elastomeric polymer may be selected, for example, from: cis-1,4-polyisoprene (natural or synthetic, preferably natural rubber), 3,4 polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

Said crosslinkable elastomeric composition may further comprise at least one reinforcing filler such as, for example, carbon black, silica, alumina, aluminosilicates, calcium carbonate, kaolin, or mixtures thereof.

The crosslinkable elastomeric composition above disclosed may be vulcanized according to known techniques, in particular with sulfur-based vulcanizing systems commonly used for elastomeric polymers. To this end, in the crosslinkable composition, after one or more steps of thermomechanical processing, a sulfur-based vulcanizing agent is incorporated together with vulcanization accelerators. In the final processing step, the temperature is generally kept below 140° C., so as to avoid any unwanted pre-crosslinking phenomena.

The vulcanizing agent most advantageously used is sulfur, or molecules containing sulfur (sulfur donors), with accelerators and activators known to those skilled in the art.

Activators that are particularly effective are zinc compounds, and in particular ZnO, $ZnCO_3$, zinc salts of saturated or unsaturated fatty acids containing from 8 to 18 carbon atoms, such as, for example, zinc stearate, which are preferably formed in situ in the crosslinkable elastomeric composition from ZnO and fatty acid, and also BiO, Pbo, $Pb_3O_4$, $PbO_2$, or mixtures thereof.

Accelerators that are commonly used may be selected, for example, from: dithiocarbamates, guanidine, thiourea, thiazoles, sulphenamides, thiurams, amines, xanthates, or mixtures thereof.

Said crosslinkable elastomeric composition may comprise other commonly used additives selected on the basis of the specific application for which the composition is intended. For example, the following may be added to said crosslinkable elastomeric composition: antioxidants, anti-ageing agents, plasticizers, adhesives, anti-ozone agents, modifying resins, fibres (for example Kevlar® pulp), or mixtures thereof.

BRIEF DESCRIPTION OF THE DRAWING

The present invention will now be illustrated in further detail by means of the attached FIG. 1 which is a side view of a tire made according to the present invention.

DETAILED DESCRIPTION OF THE INVENTION

Figure 1:
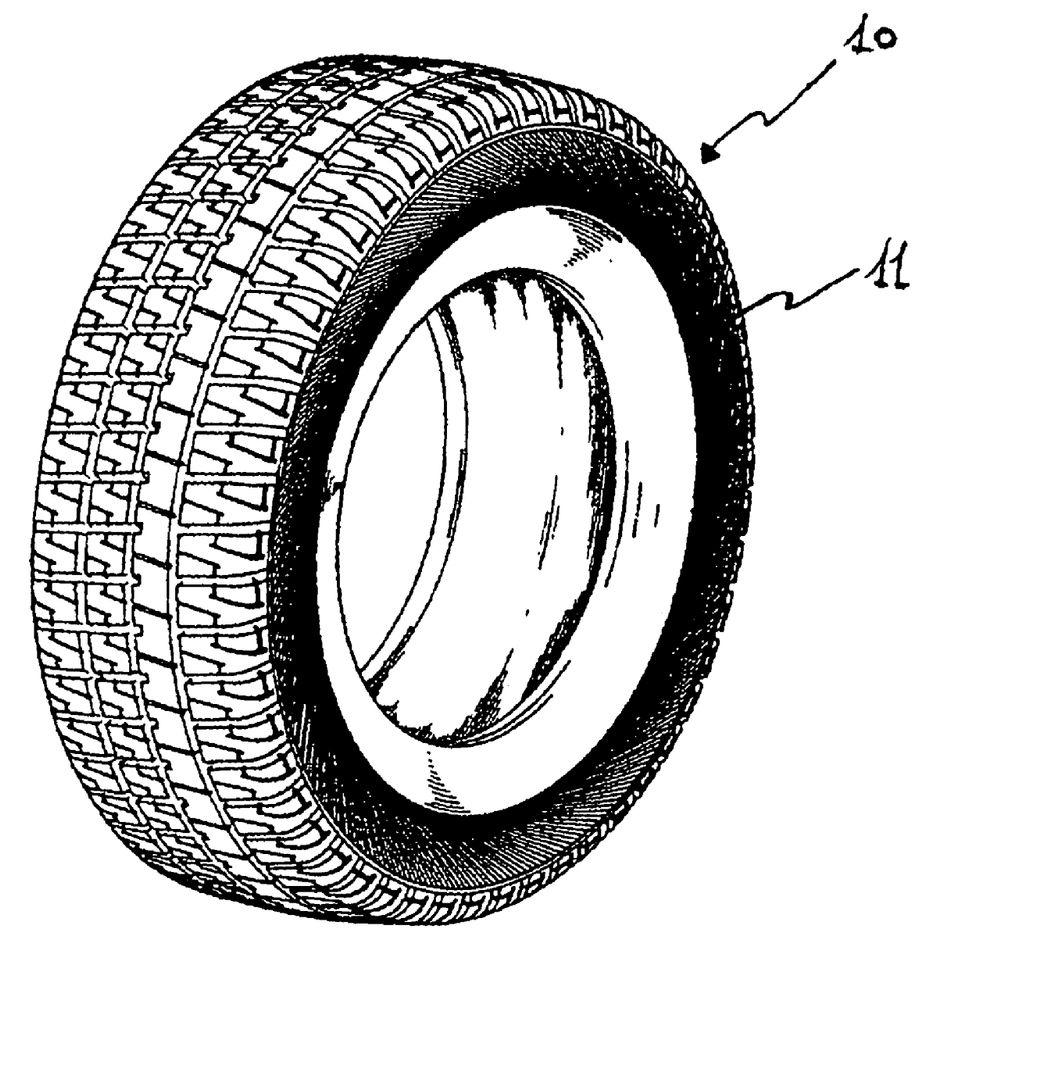

FIG. 1 shows a tire (10) having a sidewall (11) to which a composition according to the present invention is applied. In FIG. 1, the obtained coating layer is circumferentially extended to cover the whole sidewall (11). Alternatively, the coating layer may cover only a portion of the tire sidewall, such as for example, in the case said coating layer covers designs, letters, logos, trademarks, decals which may be placed upon the sidewall of the tire.

The process for producing the tire according to the present invention may be carried out according to processes and using apparatus that are known in the art, as described, for example, in European Patents EP 199,064, or in U.S. Pat. No. 4,872,822 or U.S. Pat. No. 4,768,937, said process including manufacturing the crude tire, and subsequently moulding and vulcanizing the crude tire.

The present invention will be further illustrated below by means of a number of preparation examples, which are given for purely indicative purposes and without any limitation of this invention.

The components used for the preparation of the compositions below reported were the following:

Thioplast™ G4 (Akzo Nobel): liquid polysulphide polymer with mercaptan end-groups having the following structure:

wherein R=$—(CH_2)_2—O—CH_2—O—(CH_2)_2—$ and a+b+c<7; having an average molecular weight (number-average)<1100;

Thioplast™ G22 (Akzo Nobel): liquid polysulphide polymer with mercaptan end-groups having the following structure:

wherein R=$—(CH_2)_2—O—CH_2—O—(CH_2)_2—$ and a+b++c=14-18; having an average molecular weight (number-average) 2400-3100;

Vinnol® E 15/48 A (Wacker): vinyl chloride/acrylic acid ester copolymer having a glass transition temperature of +69° C.; a hydroxyl groups contents of 1.8% by weight with respect to the total weight of the copolymer;

Desmodur® N 3390 BA/SN (Bayer): adducts of isocyanurate of hexamethylene diisocyanate; about 90% solution in butyl acetate/solvent naphtha 100 (1:1);

Permanent Red® FGR 70 (Clariant): red pigment;

Colorplast®°RAL5017 (Nuova Sivam S.p.A.): blue colouring paste;

Colorplast® RAL7001 (Nuova Sivam S.p.A.): gray colouring paste.

EXAMPLE 1

Preparation of the Two-Component Composition

First Component 30 g of butyl acetate and 20 g of Thioplast® G4 were added to a 250 ml Erlenmeyer flask and the mixture was maintained, under stirring, at room temperature (23°), for 5 min, until complete dissolution. Subsequently, 25 g of a 20% by weight solution of Vinnol® E 15/48 A in methyl ethyl ketone were added and the mixture was maintained, under stirring, at room temperature (23°), for 5 min, until complete dissolution. The Erlenmeyer flask was then sealed with a stopper to protect the solution from moisture.

Second Component 10 g of butyl acetate, 7.6 g of Desmodur® N3390 BA/SN and 0.2 g of dibutyltin dilaurate (DBTL) were added to a 100 ml Erlenmeyer flask and the mixture was maintained, under stirring, at room temperature (23°), for 5 min, until complete dissolution. The Erlenmeyer flask was then sealed with a stopper to protect the solution from moisture.

The first component and the second component were mixed just before the spray application onto the surface to be coated. The pot life of the mixed product was 16 hours.

EXAMPLE 2

Preparation of the Two-Component Composition

First Component 30 g of butyl acetate and 16 g of Thioplast® G4 were added to a 250 ml Erlenmeyer flask and the mixture was maintained, under stirring, at room temperature (23°), for 5 min, until complete dissolution.

15 g of Permanent® Red FGR 70 and 85 g of Thioplast® G22 were milled in a 3-roll mill mixer (Erweka, type AR 402), at 250 rpm, at a temperature of 23±3° C., for 10 min, obtaining a coloured paste dispersion.

Subsequently, 7 g of the obtained colored paste dispersion were added and the mixture was maintained, under stirring, at room temperature (23°), for 5 min, until complete dissolution.

Then, 25 g of a 20% by weight solution of Vinnol® E 15/48 A in methyl ethyl ketone were added and the mixture was maintained, under stirring, at room temperature (23°), for 5 min, until complete dissolution. The Erlenmeyer flask was then sealed with a stopper to protect the solution from moisture.

Second Component 10 g of butyl acetate, 7.6 g of Desmodur® N3390 BA/SN and 0.2 g of dibutyltin dilaurate (DBTL) were added to a 100 ml Erlenmeyer flask and the mixture was maintained, under stirring, at room temperature (23°), for 5 min, until complete dissolution. The Erlenmeyer flask was then sealed with a stopper to protect the solution from moisture.

The first component and the second component were mixed just before the spray application onto the surface to be coated. The pot life of the mixed product was 16 hours.

EXAMPLE 3

Preparation of the Two-Component Composition

First Component 30 g of butyl acetate and 20 g of Thioplast® G4 were added to a 250 ml Erlenmeyer flask and the mixture was maintained, under stirring, at room temperature (23°), for 5 min, until complete dissolution.

Subsequently, 25 g of a 20% by weight solution of Vinnol® E 15/48 A in methyl ethyl ketone were added and the mixture was maintained, under stirring, at room temperature (23°), for 5 min, until complete dissolution.

Then, 3 g of Coloroplast® RAL5017 were added and the mixture was maintained, under stirring, at room temperature (23°), for 15 min. The Erlenmeyer flask was then sealed with a stopper to protect the solution from moisture.

Second Component 10 g of butyl acetate, 7.6 g of Desmodur® N3390 BA/SN and 0.2 g of dibutyltin dilaurate (DBTL) were added to a 100 ml Erlenmeyer flask and the mixture was maintained, under stirring, at room temperature (23°), for 5 min, until complete dissolution. The Erlenmeyer flask was then sealed with a stopper to protect the solution from moisture.

The first component and the second component were mixed just before the spray application onto the surface to be coated. The pot life of the mixed product was 16 hours.

EXAMPLE 4

Preparation of the Two-Component Composition

First Component 30 g of butyl acetate and 20 g of Thioplast® G4 were added to a 250 ml Erlenmeyer flask and the mixture was maintained, under stirring, at room temperature (23°), for 5 min, until complete dissolution.

Subsequently, 25 g of a 20% by weight solution of Vinnol® E 15/48 A in methyl ethyl ketone were added and the mixture was maintained, under stirring, at room temperature (23°), for 5 min, until complete dissolution.

Then, 2 g of Coloroplast® RAL7001 were added and the mixture was maintained, under stirring, at room temperature (23°), for 15 min. The Erlenmeyer flask was then sealed with a stopper to protect the solution from moisture.

Second Component 10 g of butyl acetate, 7.6 g of Desmodur® N3390 BA/SN and 0.2 g of dibutyltin dilaurate (DBTL) were added to a 250 ml Erlenmeyer flask and the mixture was maintained, under stirring, at room temperature (23°), for 5 min, until complete dissolution. The Erlenmeyer flask was then sealed with a stopper to protect the solution from moisture.

The first component and the second component were mixed just before the spray application onto the surface to be coated. The pot life of the mixed product was 16 hours.

EXAMPLE 5

Xenon-Arc Accelerated Test

An elastomeric composition as disclosed in Table 1 was prepared as follows {the amounts of the various components are given in phr [phr=part per hundred parts of elastomeric polymer(s)]}.

All the components, except sulfur, retardant (PVI) and accelerator (CBS), were mixed together in an internal mixer (model Pomini PL 1.6) for about 5 min ($1^{st}$ Step). As soon as the temperature reached 145±5° C., the elastomeric composition was discharged. The sulfur, retardant (PVI) and accelerator (CBS), were then added and mixing was carried out in an open roll mixer ($2^{nd}$ Step).

TABLE 1

| EXAMPLE | 3 |
|---|---|
| $1^{st}$ STEP | |
| NR | 50 |
| BR | 50 |
| N660 | 50 |
| Zinc oxide | 3 |
| Stearic acid | 2 |
| Microcrystalline wax | 2 |
| 6-PPD | 4 |
| $2^{nd}$ STEP | |
| CBS | 0.80 |
| PVI | 0.20 |
| Sulfur | 1.80 |

(*) comparative.
NR: natural rubber;
BR: cis-1,4-polybutadiene (Europrene ® Neocis BR40 - Polimeri Europa);
N660: carbon black;
6-PPD: N-(1,3-dimethylbutyl)-N'-phenyl-p-phenylene-diamine;
CBS (accelerator): N-cyclohexyl-2-benzothiazyl sulphenamide (Vulkacit ® CZ - Bayer);
PVI (retardant): N-cyclohexylthiophthalimide (Santogard ® PVI - Monsanto).

Test pieces of the above disclosed crosslinked elastomeric compositions (vulcanized at 170° C., for 10 min) having the following dimensions: 100 mm×40 mm×3 mm, were obtained.

The obtained test pieces were washed with methyl ethyl ketone and subsequently coated with the coloured composition of Example 1, 2, 3 and 4, by spraying. The composition was let to dry, at room temperature (23° C.), for 20 minutes and, subsequently, in an oven, at 80° C., for 2 hours. After drying, a coating layer 150 μm thick was obtained.

The coated test pieces obtained as disclosed above, were subjected to Xenon-Arc Accelerated Test according to ASTM Standard D6695-03 using a Q-Sun Xe-1-S (Xenon Test Chamber with daylight filter). The following conditions were applied:

black panel temperature: 60° C. (light cycle);
irradiance level: 0.55 W/m² at 340 nm;
intermitted light/dark cycle was: 160 min light, 5 min dark, without water spraying.

After 16 hours at the conditions reported above, the test pieces were examined visually in order to determine the presence of staining. The obtained results are the following:

test pieces coated with a composition of Example 1: no detectable staining;
test pieces coated with a composition of Example 2: no detectable staining;
test pieces coated with a composition of Example 3: no detectable staining;
test pieces coated with a composition of Example 4: no detectable staining.

Moreover, the above reported test pieces were manually scratched with a scraper in order to evaluate the adhesion of the coating layer to the rubber surface: all the four test pieces showed good adhesion.

EXAMPLE 5

Dynamic Ozone Test

The dynamic ozone test was carried out as follow.

Test pieces of the above disclosed crosslinked elastomeric compositions (vulcanized at 170° C., for 10 min) having the following dimensions: 30 mm×8 mm×1 mm, were obtained.

The obtained test pieces were washed with methyl ethyl ketone and subsequently coated with the coloured composition of Example 1, 2, 3 and 4, by spraying. The composition was let to dry, at room temperature (23° C.), for 20 minutes and, subsequently, in an oven, at 80° C., for 2 hours. After drying, a coating layer 150 μm thick was obtained.

The coated test pieces obtained as disclosed above, were positioned inside a bell-glass wherein a ozonized air [ozone concentration equal to 10±2 pphm (parts per hundred millions)] was conveyed and were dynamically continuously subjected to traction from 0% to 20% of strain. The test was carried out at ambient temperature (23° C.).

Every 2 hours (for a total time of 17 hours) at the conditions reported above, the test pieces were examined at the optical microscope (40×) in order to determine the presence of cracks.

The results of said test are expressed by means of an evaluation scale which runs from 0 to 5:

0=no cracks visible with the optical microscope (40×);
5=cracks visible with the optical microscope (40×) and with the naked eye.

After 17 hours, the obtained data are the following:
test piece of Example 1: 0;
test piece of Example 2: 0;
test piece of Example 3: 0;
test piece of Example 4: 0.

The invention claimed is:

1. A tire comprising at least one outer structural element, wherein said at least one outer structural element is at least partially coated by at least one coating layer comprising a crosslinked composition obtained by reacting:
 (a) at least one polysulfide polymer;
 (b) at least one thermoplastic polymer having at least one hydroxyl group selected from:
  ($b_1$) vinyl chloride copolymers;
  ($b_2$) hydrogenated polyketones;
  or mixtures thereof; and
 (c) at least one polyisocyanate.

2. The tire according to claim 1 comprising:
 a carcass structure of a substantially toroidal shape, having opposite lateral edges associated with respective right-hand and left-hand bead structures, said bead structures comprising at least one bead core and at least one bead filler;
 a belt structure applied in a radially external position with respect to said carcass structure;
 a tread band radially superimposed on said belt structure; and
 a pair of sidewalls applied laterally on opposite sides with respect to said carcass structure,
wherein said at least one outer structural element is at least one of said sidewalls.

3. The tire according to claim 1, wherein said at least one polysulfide polymer (a) is selected from liquid polysulfide polymers having an average molecular weight (number-average) of 500 g/mol to 10,000 g/mol.

4. The tire according to claim 3, wherein said at least one polysulfide polymer (a) is selected from liquid polysulfide polymers having an average molecular weight (number-average) of 800 g/mol to 8,000 g/mol.

5. The tire according to claim 1, wherein said at least one polysulfide polymer (a) is selected from compounds having the following general formulae (I) or (II):

wherein:
 R is an alkylenoxy group, or a —$(CH_2)_2$—O—$CH_2$—O—$(CH_2)_2$— group;
 n is an integer of from 4 to 60, extremes included; and
 a, b, and c are integers, and are the same or different from each other, a+b+c being from 4 to 60, extremes included;
 or mixtures thereof.

6. The tire according to claim 1, wherein said at least one polysulfide polymer (a) is present in the crosslinked composition in an amount of 5% by weight to 80% by weight with respect to the total weight of the dry crosslinked composition.

7. The tire according to claim 6, wherein said at least one polysulfide polymer (a) is present in the crosslinked composition in an amount of 20% by weight to 70% by weight with respect to the total weight of the dry crosslinked composition.

8. The tire according to claim 1, wherein said at least one thermoplastic polymer having at least one hydroxyl group (b) comprises no lower than 1% by weight hydroxyl groups with respect to the total weight of the thermoplastic polymer (b).

9. The tire according to claim 8, wherein said at least one thermoplastic polymer having at least one hydroxyl group (b) comprises 1.5% by weight to 20% by weight hydroxyl groups with respect to the total weight of the thermoplastic polymer (b).

10. The tire according to claim 1, wherein said thermoplastic polymer (b) has a glass transition temperature higher than or equal to 20° C.

11. The tire according to claim 10, wherein said thermoplastic polymer (b) has a glass transition temperature of 30° C. to 150° C.

12. The tire according to claim 11, wherein said thermoplastic polymer (b) has a glass transition temperature of 45° C. to 100° C.

13. The tire according to claim 1, wherein said vinyl chloride copolymers ($b_1$) are selected from copolymers of vinyl chloride with at least one other vinyl comonomer.

14. The tire according to claim 13, wherein said vinyl comonomer is selected from: vinyl acetate, vinyl alcohol, 2-propenyl acetate, acrylic acid, acrylic acid esters, methyl methacrylate, 2-hydroxypropyl acrylate, glycidyl methacrylate, isobutyl vinyl ether, maleic acid, vinyl stearate, acrylamide, vinyl sulfonic acid, vinylidene chloride, or mixtures thereof.

15. The tire according to claim 1, wherein said vinyl chloride copolymers ($b_1$) are selected from vinyl chloride/acrylic acid ester copolymers, vinyl chloride/vinyl acetate copolymers, or mixtures thereof.

16. The tire according to claim 1, wherein said vinyl chloride copolymers ($b_1$) contain carboxylic and/or epoxy functional groups.

17. The tire according to claim 1, wherein said vinyl chloride copolymers ($b_1$) comprise terpolymers of vinyl chloride, another vinyl compound or vinyl acetate, and an unsaturated carboxylic or polycarboxylic acid or ester.

18. The tire according to claim 17, wherein said terpolymers comprise vinyl chloride/vinyl acetate/maleic acid terpolymers; vinyl chloride/vinyl acetate/acrylic acid terpolymers, vinyl chloride/vinyl acetate/crotonic acid terpolymers, or mixture thereof.

19. The tire according to claim 1, wherein said hydrogenated polyketones ($b_2$) are selected from compounds having the following general formula (III):

wherein:
R groups, which may be the same or different from each other, represent a linear or branched $C_1$-$C_{20}$ alkyl group; a $C_6$-$C_{18}$ aryl group; and
the n:m ratio is from 0.1:1 to 1:1.

20. The tire according to claim 19, wherein said compounds having general formula (III) are: hydrogenated poly(vinyl methyl ketone), hydrogenated poly(vinyl butyl ketone), hydrogenated poly(vinyl phenyl ketone), hydrogenated poly(vinyl naphthyl ketone), or mixtures thereof.

21. The tire according to claim 20, wherein said compounds having general formula (III) are hydrogenated poly (vinyl phenyl ketone).

22. The tire according to claim 1, wherein said thermoplastic polymer having at least one hydroxyl group (b) is present in the crosslinked composition in an amount of 1% by weight to 50% by weight with respect to the total weight of the dry crosslinked composition.

23. The tire according to claim 22, wherein said thermoplastic polymer having at least one hydroxyl group (b) is present in the crosslinked composition in an amount of 5% by weight to 25% by weight with respect to the total weight of the dry crosslinked composition.

24. The tire according to claim 1, wherein said at least one polyisocyanate (c) is selected from aliphatic polyisocyanates, trimethylene diisocyanate, 1,2-propylene diisocyanate, tetramethylene diisocyanate, 2,3-butylene diisocyanate, hexamethylene diisocyanate, octamethylene diisocyanate, 4-isocyanatomethyl-1,8-octane diisocyanate, 2,2,4-trimethyl hexamethylene diisocyanate, 2,4,4-trimethyl hexamethylene diisocyanate, dodecamethylene diisocyanate, α,α'-dipropyl ether diisocyanate, transvinylidene diisocyanate, or mixtures thereof; alicyclic polyisocyanates, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, isophorone diisocyanate, or mixtures thereof; aromatic polyisocyanates, m- and p-phenylene diisocyanate, 1,3- and 1,4-bis(isocyanate methyl)benzene, 1,5-dimethyl-2,4-bis (isocyanate methyl)benzene, 1,3,5-triisocyanate benzene, 2,4- and 2,6-toluene diisocyanate, 2,4,6-toluene triisocyanate, α,α,α',α'-tetramethyl o-, m-, and p-xylylene diisocyanate, 4,4'-diphenylene diisocyanate methane, 4,4-diphenylene diisocyanate, 3,3'-dichloro-4,4'-diphenylene diisocyanate, naphthalene-1,5-diisocyanate, or mixtures thereof.

25. The tire according to claim 1, wherein said at least one polyisocyanate (c) is selected from adducts of polyisocyanates, biurets, isocyanurates, allophonates, uretdiones, prepolymers of polyisocyanates, or mixtures thereof.

26. The tire according to claim 25, wherein said adducts are the adduct of two molecules of hexamethylene diisocyanate or isophorone diisocyanate to a diol, ethylene glycol, the adduct of 3 molecules of hexamethylene diisocyanate to 1 molecule of water, the adduct of 1 molecule of trimethylol propane to 3 molecules of isophorone diisocyanate, the reaction product of 3 moles of m-α,α,α',α'-tetramethylxylene diisocyanate with 1 mole of trimethylol propane, the adduct of 1 molecule of pentaerythritol to 4 molecules of toluene diisocyanate, the isocyanurate of hexamethylene diisocyanate, the uretdione of hexamethylene diisocyanate, the allophonate of hexamethylene diisocyanate, the adduct of 3 moles of toluene diisocyanate to 1 mole of trimethylol propane, the isocyanurate of isophorone diisocyanate, or mixtures thereof.

27. The tire according to claim 1, wherein said at least one polyisocyanate (c) is present in the crosslinked composition in an amount of 5% by weight to 50% by weight with respect to the total weight of the dry crosslinked composition.

28. The tire according to claim 27, wherein said at least one polyisocyanate (c) is present in the crosslinked composition in an amount of 10% by weight to 30% by weight with respect to the total weight of the dry crosslinked composition.

29. The tire according to claim 1, wherein said crosslinked composition comprises at least one colouring agent (d).

30. The tire according to claim 29, wherein said colouring agent (d) is selected from: iron oxide, titanium dioxide, mica, calcium sodium borosilicate, powdered metals, powdered aluminum or powdered copper, metal pastes, aluminum pastes, colouring pastes containing pigments, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof.

31. The tire according to claim 29, wherein said at least one colouring agent (d) is present in the crosslinked composition in an amount of 1% by weight to 50% by weight with respect to the total weight of the dry crosslinked composition.

32. The tire according to claim 31, wherein said at least one colouring agent (d) is present in the crosslinked composition in an amount of 4% by weight to 30% by weight with respect to the total weight of the dry crosslinked composition.

33. A kit for surface treatment of crosslinked elastomeric articles comprising:
a first component comprising (a) at least one polysulfide polymer and (b) at least one thermoplastic polymer having at least one hydroxyl group selected from:
($b_1$) vinyl chloride copolymers;
($b_2$) hydrogenated polyketones;
or mixtures thereof; and
a second component comprising (c) at least one polyisocyanate.

34. The kit for surface treatment of crosslinked elastomeric articles according to claim 33, wherein said at least one polysulfide polymer (a):
is selected from liquid polysulfide polymers having an average molecular weight (number-average) of 500 g/mol to 10,000 g/mol; or
is selected from compounds having the following general formulae (I) or (II):

$$HS-(R-SS)_n-R-SH \quad (I)$$

wherein:
R is an alkylenoxy group, or a —$(CH_2)_2$—O—$CH_2$—O—$(CH_2)_2$— group;
n is an integer of from 4 to 60, extremes included; and
a, b, and c are integers, and are the same or different from each other, a+b+c being from 4 to 60, extremes included; or mixtures thereof; or
wherein said at least one polysulfide polymer (a) is present in the crosslinked composition in an amount of 5% by weight to 80% by weight with respect to the total weight of the dry crosslinked composition.

35. The kit for surface treatment of crosslinked elastomeric articles according to claim 33, wherein said at least one thermoplastic polymer (b):
contains no lower than 1% by weight hydroxyl groups with respect to the total weight of the thermoplastic polymer (b); or
is selected from vinyl chloride copolymers ($b_1$), wherein said vinyl chloride copolymers ($b_1$) are selected from copolymers of vinyl chloride with at least one other vinyl comonomer; or
is selected from vinyl chloride copolymers ($b_1$), wherein said vinyl chloride copolymers ($b_1$) are selected from vinyl chloride/acrylic acid ester copolymers, vinyl chloride/vinyl acetate copolymers, or mixtures thereof; or is selected from vinyl chloride copolymers ($b_1$), wherein said vinyl chloride copolymers ($b_1$) contain carboxylic and/or epoxy functional groups; or
is selected from vinyl chloride copolymers ($b_1$), wherein said vinyl chloride copolymers ($b_1$) comprise terpolymers of vinyl chloride, another vinyl compound or vinyl acetate, and an unsaturated carboxylic or polycarboxylic acid or ester; or
is selected from hydrogenated polyketones ($b_2$), wherein said hydrogenated polyketones ($b_2$) are selected from compounds having the following general formula (III):

wherein:
R groups, which may be the same or different from each other, represent a linear or branched $C_1$-$C_{20}$ alkyl group; a $C_6$-$C_{18}$ aryl group; and
the n:m ratio is 0.1:1 to 1:1; or
wherein said at least one thermoplastic polymer (b) is present in the crosslinked composition in an amount of 1% by weight to 50% by weight with respect to the total weight of the dry crosslinked composition; or
wherein said at least one thermoplastic polymer (b) has a glass transition temperature higher than or equal to 20° C.

36. The kit for surface treatment of crosslinked elastomeric articles according to claim 33, wherein said at least one polyisocyante (c):
is selected from aliphatic polyisocyanates, trimethylene diisocyanate, 1,2-propylene diisocyanate, tetramethylene diisocyanate, 2,3-butylene diisocyanate, hexamethylene diisocyanate, octamethylene diisocyanate, 4-isocyanatomethyl-1,8-octane diisocyanate, 2,2,4-trimethyl hexamethylene diisocyanate, 2,4,4-trimethyl hexamethylene diisocyanate, dodecamethylene diisocyanate, α,α'-dipropyl ether diisocyanate, transvinylidene diisocyanate, or mixtures thereof; alicyclic polyisocyanates, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, isophorone diisocyanate, or mixtures thereof; aromatic polyisocyanates m- and p-phenylene diisocyanate, 1,3- and 1,4-bis(isocyanate methyl)benzene, 1,5-dimethyl-2,4-bis(isocyanate methyl)benzene, 1,3,5-triisocyanate benzene, 2,4- and 2,6-toluene diisocyanate, 2,4,6-toluene triisocyanate, α,α,α',α'-tetramethyl o-, m-, and p-xylylene diisocyanate, 4,4'-diphenylene diisocyanate methane, 4,4-diphenylene diisocyanate, 3,3'-dichloro-4,4'-diphenylene diisocyanate, naphthalene-1,5-diisocyanate, or mixtures thereof; or mixtures thereof; or
is selected from adducts of polyisocyanates biurets, isocyanurates, allophonates, uretdiones, prepolymers of polyisocyanates, or mixtures thereof; or
is selected from adducts of polyisocyanates, wherein said adducts are the adduct of two molecules of hexamethylene diisocyanate or isophorone diisocyanate to a diol, ethylene glycol, the adduct of 3 molecules of hexamethylene diisocyanate to 1 molecule of water, the adduct of 1 molecule of trimethylol propane to 3 molecules of isophorone diisocyanate, the reaction product of 3 moles of m-α,α,α',α'-tetramethylxylene diisocyanate with 1 mole of trimethylol propane, the adduct of 1 molecule of pentaerythritol to 4 molecules of toluene diisocyanate, the isocyanurate of hexamethylene diisocyanate, the uretdione of hexamethylene diisocyanate, the allophonate of hexamethylene diisocyanate, the adduct of 3 moles of toluene diisocyanate to 1 mole of trimethylol propane, the isocyanurate of isophorone diisocyanate, or mixtures thereof; or wherein said at least one polyisocyanate (c) is present in the crosslinked composition in an amount of 5% by weight to 50% by weight with respect to the total weight of the dry crosslinked composition.

37. The kit for surface treatment of crosslinked elastomeric articles according to claim 33, comprising at least one colouring agent (d):

selected from: iron oxide, titanium dioxide, mica, calcium sodium borosilicate, powdered metals, powdered aluminum or copper, metal pastes, aluminum pastes, colouring pastes containing pigments, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof; or wherein said at least one colouring agent (d) is present in the crosslinked composition in an amount of 1% by weight to 50% by weight with respect to the total weight of the dry crosslinked composition.

38. A crosslinked manufactured article comprising a crosslinked elastomeric composition, said crosslinked manufactured article being at least partially coated by at least one coating layer comprising a crosslinked composition obtained by reacting:

(a) at least one polysulfide polymer;
(b) at least one thermoplastic polymer having at least one hydroxyl group selected from:
($b_1$) vinyl chloride copolymers;
($b_2$) hydrogenated polyketones;
or mixtures thereof; and
(c) at least one polyisocyanate.

39. The crosslinked manufactured article according to claim 38, wherein said at least one polysulfide polymer (a):

is selected from liquid polysulfide polymers having an average molecular weight (number-average) of 500 g/mol to 10,000 g/mol; or
is selected from compounds having the following general formulae (I) or (II):

wherein:
R is an alkylenoxy group, or a —$(CH_2)_2$—O—$CH_2$—O—$(CH_2)_2$— group;
n is an integer of from 4 to 60, extremes included; and
a, b, and c are integers, and are the same or different from each other, a+b+c being from 4 to 60, extremes included;
or mixtures thereof; or wherein said at least one polysulfide polymer (a) is present in the crosslinked composition in an amount of 5% by weight to 80% by weight with respect to the total weight of the dry crosslinked composition.

40. The crosslinked manufactured article according to claim 38, wherein said at least one thermoplastic polymer (b):

contains no lower than 1% by weight hydroxyl groups with respect to the total weight of the thermoplastic polymer (b); or
has a glass transition temperature higher than or equal to 20° C.; or
is selected from vinyl chloride copolymers ($b_1$), wherein said vinyl chloride copolymers ($b_1$) are selected from copolymers of vinyl chloride with at least one other vinyl comonomer; or
is selected from vinyl chloride copolymers ($b_1$), wherein said vinyl chloride copolymers ($b_1$) are selected from vinyl chloride/acrylic acid ester copolymers, vinyl chloride/vinyl acetate copolymers, or mixtures thereof; or
is selected from vinyl chloride copolymers ($b_1$), wherein said vinyl chloride copolymers ($b_1$) contain carboxylic and/or epoxy functional groups; or
is selected from vinyl chloride copolymers ($b_1$), wherein said vinyl chloride copolymers ($b_1$) comprise terpolymers of vinyl chloride, another vinyl compound or vinyl acetate, and an unsaturated carboxylic or polycarboxylic acid or ester; or
is selected from hydrogenated polyketones ($b_2$), wherein said hydrogenated polyketones ($b_2$) are selected from compounds having the following general formula (III):

wherein:
R groups, which may be the same or different from each other, represent a linear or branched $C_1$-$C_{20}$ alkyl group; a $C_6$-$C_{18}$ aryl group; and
the n:m ratio is 0.1:1 to 1:1; or
wherein said at least one thermoplastic polymer (b) is present in the crosslinked composition in an amount of 1% by weight to 50% by weight with respect to the total weight of the dry crosslinked composition.

41. The crosslinked manufactured article according to claim 38, wherein said at least one polyisocyante (c):

is selected from aliphatic polyisocyanates, trimethylene diisocyanate, 1,2-propylene diisocyanate, tetramethylene diisocyanate, 2,3-butylene diisocyanate, hexamethylene diisocyanate, octamethylene diisocyanate, 4-isocyanatomethyl-1,8-octane diisocyanate, 2,2,4-trimethyl hexamethylene diisocyanate, 2,4,4-trimethyl hexamethylene diisocyanate, dodecamethylene diisocyanate, α,α'-dipropyl ether diisocyanate, transvinylidene diisocyanate, or mixtures thereof; alicyclic polyisocyanates 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, isophorone diisocyanate, or mixtures thereof; aromatic polyisocyanates, m- and p-phenylene diisocyanate, 1,3- and 1,4-bis(isocyanate methyl)benzene, 1,5-dimethyl-2,4-bis(isocyanate methyl)benzene, 1,3,5-triisocyanate benzene, 2,4- and 2,6-toluene diisocyanate, 2,4,6-toluene triisocyanate, α,α,α',α'-tetramethyl o-, m-, and p-xylylene diisocyanate, 4,4'-diphenylene diisocyanate methane, 4,4-diphenylene diisocyanate, 3,3'-dichloro-4,4'-diphenylene diisocyanate, naphthalene-1,5-diisocyanate, or mixtures thereof; or

- is selected from adducts of polyisocyanates biurets, isocyanurates, allophonates, uretdiones, prepolymers of polyisocyanates, or mixtures thereof; or
- is selected from adducts of polyisocyanates, wherein said adducts are the adduct of two molecules of hexamethylene diisocyanate or isophorone diisocyanate to a diol, ethylene glycol, the adduct of 3 molecules of hexamethylene diisocyanate to 1 molecule of water, the adduct of 1 molecule of trimethylol propane to 3 molecules of isophorone diisocyanate, the reaction product of 3 moles of m-α,α,α',α'-tetramethylxylene diisocyanate with 1 mole of trimethylol propane, the adduct of 1 molecule of pentaerythritol to 4 molecules of toluene diisocyanate, the isocyanurate of hexamethylene diisocyanate, the uretdione of hexamethylene diisocyanate, the allophonate of hexamethylene diisocyanate, the adduct of 3 moles of toluene diisocyanate to 1 mole of trimethylol propane, the isocyanurate of isophorone diisocyanate, or mixtures thereof; or
- wherein said at least one polyisocyanate (c) is present in the crosslinked composition in an amount of 5% by weight to 50% by weight with respect to the total weight of the dry crosslinked composition.

42. The crosslinked manufactured article according to claim 38, wherein said crosslinked composition comprises at least one colouring agent (d):

- selected from: iron oxide, titanium dioxide, mica, calcium sodium borosilicate, powdered metals, powdered aluminum or copper, metal pastes, aluminum pastes, colouring pastes containing pigments, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof; or
- wherein said at least one colouring agent (d) present in the crosslinked composition in an amount of 1% by weight to 50% by weight with respect to the total weight of the dry crosslinked composition.

43. A method of applying a crosslinkable composition comprising a first component and a second component onto the surface of a crosslinked manufactured article comprising a crosslinked elastomeric composition, comprising the following steps:

(i) cleaning at least one portion of the surface to be coated with a solvent;
(ii) mixing the first component comprising (a) at least one polysulfide polymer and (b) at least one thermoplastic polymer having at least one hydroxyl group, with a second component comprising (c) at least one polyisocyanate, so as to obtain a crosslinkable composition; and
(iii) applying the crosslinkable composition obtained in step (ii) onto said surface, so as to obtain a coating layer.

44. The method according to claim 43, wherein the solvent used in step (i) is selected from: ketones, acetone, methyl ethyl ketone, methyl isobutyl ketone, or mixtures thereof; alcohols, methanol, ethanol, isopropanol, butanol, or mixtures thereof; aliphatic or aromatic hydrocarbons, pentane, hexane, benzene, toluene, or mixtures thereof; or mixtures thereof.

45. The method according to claim 43, wherein said first component and said second component are mixed together not more than 24 hours before step (iii) is carried out.

46. The method according to claim 43, wherein said first component and said second component comprise at least one organic solvent.

47. The method according to claim 46, wherein said organic solvent is selected from: esters, methyl acetate, butyl acetate, isobutyl acetate, propyl acetate, or mixtures thereof; ketones, acetone, methyl ethyl ketone, methyl isobutyl ketone, or mixtures thereof; alcohols, methanol, ethanol, isopropanol, butanol, or mixtures thereof; aliphatic or aromatic hydrocarbons, pentane, hexane, heptane, benzene, toluene, or mixtures thereof.

48. The method according to claim 46, wherein said at least one organic solvent is present in the crosslinkable composition in an amount of 20% by weight to 80% by weight with respect to the total weight of the crosslinkable composition.

49. The method according to claim 43, wherein said first component and said second component comprise at least one catalyst selected from: organometallic compounds, amines, or mixtures thereof.

50. The method according to claim 49, wherein said at least one catalyst is present in the crosslinkable composition in an amount of 0.01% by weight to 2% by weight with respect to the total weight of the crosslinkable composition.

51. The method according to claim 43, wherein step (iii) is carried out by painting, brushing, spraying, rolling, dipping, scraping, or pad printing.

52. The method according to claim 43, wherein after the applying step (iii), a crosslinked manufactured article is left to dry at ambient temperature for 20 hours to 72 hours.

53. The method according to claim 43, wherein after the applying step (iii), a crosslinked manufactured article is dried by heating at a temperature of 50° C. to 120° C., for 10 minutes to 6 hours.

* * * * *